United States Patent [19]
Daniel

[11] Patent Number: 6,076,456
[45] Date of Patent: Jun. 20, 2000

[54] FLYWHEEL QUILL WITH THRUST PLATES AND AXIAL ROTOR GUIDING

[75] Inventor: Edward A. Daniel, Ft. Loramie, Ohio

[73] Assignee: The Minster Machine Company, Minster, Ohio

[21] Appl. No.: 09/151,126

[22] Filed: Sep. 10, 1998

[51] Int. Cl.[7] ...................................................... B30B 1/26
[52] U.S. Cl. .......................... 100/282; 72/452.5; 74/574; 384/115
[58] Field of Search ..................................... 100/280, 282, 100/292; 72/452.5; 384/113, 115, 119, 135; 74/573 F, 574

[56] References Cited

U.S. PATENT DOCUMENTS

| | | |
|---|---|---|
| 3,813,133 | 5/1974 | Walter et al. . |
| 3,858,432 | 1/1975 | Voorhees et al. . |
| 3,983,738 | 10/1976 | Vlasov et al. .......................... 100/282 |
| 4,427,308 | 1/1984 | Sandberg . |
| 5,271,676 | 12/1993 | Keck et al. . |
| 5,349,883 | 9/1994 | Reik et al. ................................. 74/574 |
| 5,556,207 | 9/1996 | Daniel . |
| 5,564,333 | 10/1996 | Palmer . |
| 5,628,248 | 5/1997 | Oen et al. . |
| 5,634,724 | 6/1997 | Zang et al. . |

FOREIGN PATENT DOCUMENTS

| | | | |
|---|---|---|---|
| 0398265 | 11/1990 | European Pat. Off. ............... | 100/280 |

*Primary Examiner*—Stephen F. Gerrity
*Attorney, Agent, or Firm*—Randall J. Kluth

[57] ABSTRACT

A flywheel quill with thrust plate and axial rotor guiding. Bronze thrust plates are attached to the hub of a flywheel and hydrostatic pads secured to the frame of a press are adjoining the bronze thrust plates, such that axial motion of the flywheel with attached thrust plates is limited and reduced.

11 Claims, 2 Drawing Sheets

FLYWHEEL QUILL WITH THRUST PLATES AND AXIAL ROTOR GUIDING

BACKGROUND OF THE INVENTION

1. Field of the Invention

The present invention relates to a mechanical press and in particular, to a flywheel subject to a possible axial movement during rotation.

2. Description of the Related Art

Mechanical presses such as straight side presses and gap frame presses for stamping and drawing comprise a frame for reciprocal motion towards and away from the bed. The slide is driven by a crankshaft having a connecting arm connected to the slide to which is mounted the upper die. The lower die is mounted to a bolster which, in turn, is connected to the bed. Such mechanical presses are widely used for blanking and drawing operations and vary substantially in their the size and available tonnage, depending on their intended use.

The primary source for stored mechanical energy in a mechanical press is a flywheel. The flywheel is located between the main drive motor and the clutch. The flywheel and the flywheel bearings are mounted on either the driveshaft, crankshaft, or the press frame by use of a quill. The train motor replenishes the energy lost from the flywheel during press stamping operations when the clutch couples the flywheel to the press driven parts. During engagement of the clutch, the flywheel drops in speed and the press driven parts come up to press running speeds. During engagement with the clutch, the press flywheel rotates in unison with the clutch while the flywheel bearings have no relative motion, except in the case of the use of the quill where relative motion is always present.

One problem with current mechanical presses is that during operation, there may be axial movement of the flywheel as the flywheel rotates about the driveshaft, crankshaft, or quill. Axial movement of the flywheel may result in abnormal wear of bearings and other parts. For example, the quill can be scored if the axially moving flywheel's bushings contact the quill.

SUMMARY OF THE INVENTION

According to the present invention, a press includes a flywheel which is axially biased and centered to prevent axial movement of the flywheel along the quill or other member on which the flywheel is rotatably mounted.

The invention, in one form thereof, is a hydrostatic biasing system for a flywheel. The system includes two thrust plates. One bronze thrust plate is secured to each side of the flywheel. At least one outboard hydrostatic bearing pad is located adjacent the thrust plates of the flywheel such that axial movement of the flywheel is limited.

The invention, in another form, is a flywheel bearing to provide axial rotor guiding. The bearing includes a thrust plate secured to the flywheel on one of the two axial faces. A hydrostatic bearing pad is secured to the frame of the press and is adjacent the thrust plate of the flywheel such that axial movement of the flywheel is limited.

The invention in a further embodiment, includes a bearing system to prevent axial movement of a flywheel which includes two thrust plates, one being attached to a hub of a flywheel on each of the two opposite axial faces. At least one hydrostatic bearing pad is attached to the press frame on either side of the flywheel outboardly adjacent the attached thrust plates, such that axial movement of the flywheel is limited.

An advantage of the present invention is the prevention of damage to the quill or bushings during press operation. The present invention reduces and limits axial movement of the flywheel during its rotation. Consequently, the flywheel is provided with a true or balanced rotation. A non-balanced is flywheel may result in damage to the quill or the bushing by causing the bushing of the flywheel to make physical contact with the quill as the flywheel leans axially to one side or the other. This invention prevents that axial motion and therefore, prevents potential damage to the quill or other press member that the flywheel is mounted on.

Another advantage of the present invention is a decrease or shortening of downtime of the press. Since the present invention prevents and reduces wear on the bearings, including the bushings and quill of a mechanical press, there will be less maintenance required to maintain the press in operating order. Consequently, there will be less downtime required to service the press. In addition, there will be a cost savings enjoyed by the diminished need for service and shortened downtime of the mechanical press.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
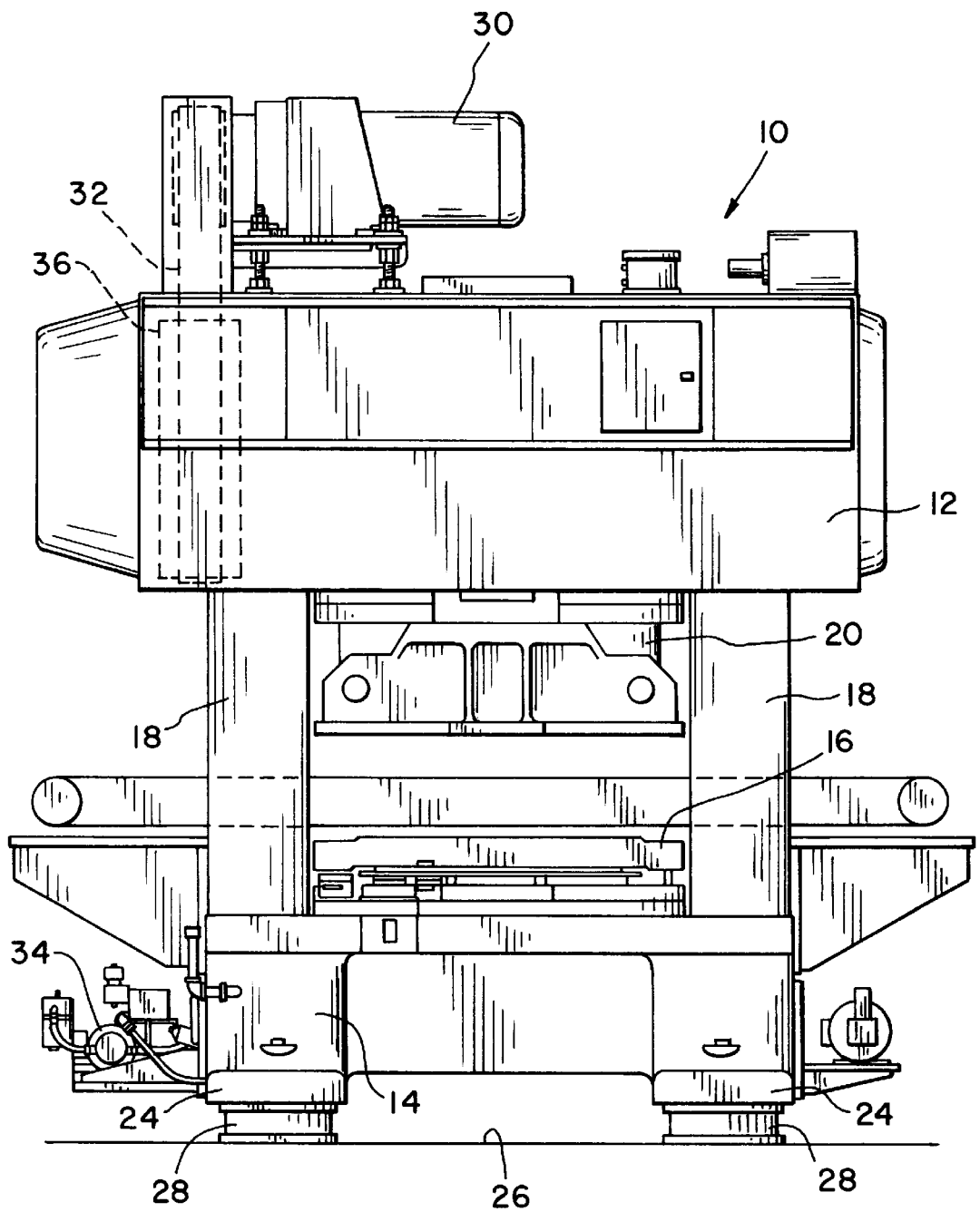
FIG. 1 is an elevational front view of one configuration of a mechanical press incorporating the present invention in one form thereof.

Referring now to the drawings and particularly to FIG. 1, there is shown a mechanical press 10 comprising a crown 12, a bed portion 14 having a bolster assembly or slide 16 connected thereto and uprights 18 connecting crown portion 12 with bed portion 14. Uprights 18 are connected to or integral with the underside of crown 12 and the upper side of bed 14. A slide 20 is positioned between uprights 18 for reciprocating movement. Tie rods (not shown) extending through crown 12, uprights 18, and bed portions 14, are attached at each end with tie rod nuts (not shown). Leg members 24 are formed at an extension of bed 14 and are generally mounted on shop floor 26 by means of shock absorbing pads 28. A drive press motor 30, part of the drive mechanism, is attached by means of a belt 32 to main flywheel 36. Hydraulic oil pump 34 provides oil to provide lubrication between moving parts.

Figure 2:
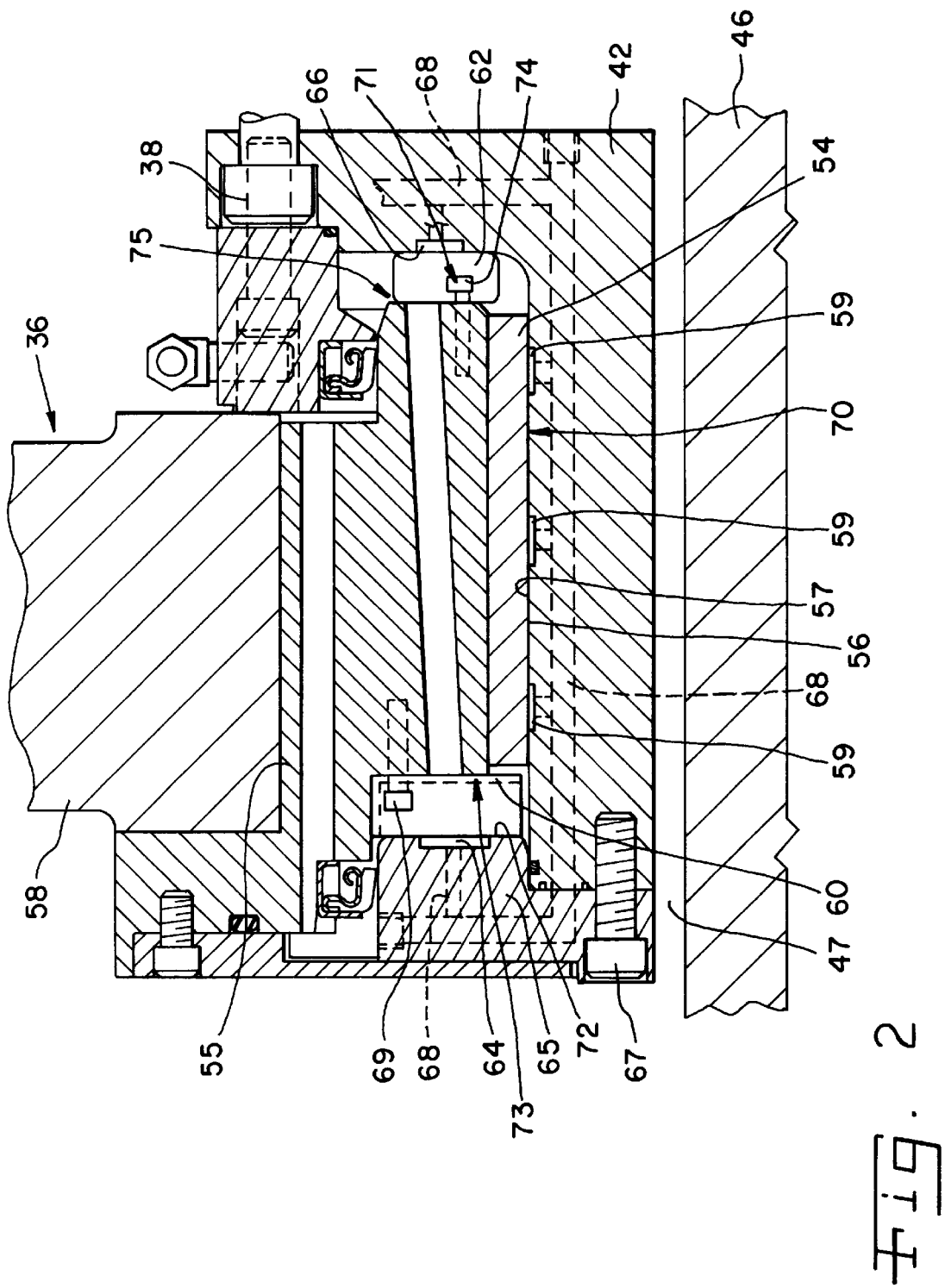
FIG. 2 is a fragmentary vertical sectional view of the mechanical press of FIG. 1.

Referring to FIG. 2, flywheel 36 is rotatable about quill 42 and is connected to crankshaft 46 by conventional combination clutch/brake assembly (not shown). Quill 42 is attached by bolt 38 to press frame or crown 12. The press crankshaft 46 rotates within quill 42. Gap 47 separates quill 42 from crankshaft 46. As known in conventional press art, crankshaft 46 is further connected to slide 20 by a connecting rod to cause rotational energy of crankshaft 46 to be translated into reciprocating movement of slide 20.

Bearing bushing 54 is annularly disposed between quill 42 and flywheel hub 55 and forms a clearance 56 therebetween. Bearing bushing 54 has an internal bore which forms bearing surface 57. In the preferred embodiment, bearing bushing 54 is composed of bronze. Flywheel hub 55 is attached to flywheel web 58 of flywheel 36. Alternatively, flywheel hub 55 may be an integral piece with flywheel web 58 or with entire flywheel 36. A plurality of hydrostatic bearing pads 59 are located along quill 42. Hydrostatic bearing pads 59 open toward bearing surface 57.

The present invention includes bronze thrust plates 60, 62 that are secured to a hub 55 of flywheel 36 by bolts 69 and 71, respectively. Alternatively, other fastening means may be employed for securing bronze thrust plates 60, 62 to hub 55. Bronze thrust plates 60, 62 are opposite hydrostatic bearing pads 64, 66 respectively. Hydrostatic bearing pad 64 extends from retainer 65. Bolt 67 fastens retainer 65 to quill 42. As shown, thrust plates 60 and 62 are disposed at respective axial face sections illustratively depicted at 73, 75 of the flywheel assembly (e.g., flywheel hub 55).

In the preferred embodiment, oil is used for lubrication between moving parts, but equivalent other liquids or fluids may be utilized. Oil is applied through oil conduits 68 drilled through quill 42. A hydraulic oil pump 34 (shown in FIG. 1) is used to pressurize oil or fluid thereby causing pressurized fluid to flow through oil conduits 68 to quill 42 and hydrostatic pads 59, 64, 66.

During operation of press 10, as flywheel 36 rotates about quill 42, hydrostatic pads 59 create hydrostatic bearing 70 between quill 42 and bearing surface 57. Pressurized fluid in sufficient quantity supplied through oil conduit 68 into hydrostatic pad 59, creates hydrostatic bearing 70. Consequently, metal-to-metal contact is eliminated.

Thrust plates 60, 62 with hydrostatic pads 64, 66 respectively, limit or prevent axial movement of flywheel 36 along quill 42 as flywheel 36 rotates about quill 42. Hydrostatic pads 64, 66, when supplied with sufficient pressurized liquid, create hydrostatic bearings 72, 74, respectively, between hydrostatic pad 64, 66 and thrust plates 60, 62 whereby axial movement of flywheel 36 along quill 42 is prevented. In addition, hydrostatic bearings 72, 74 ensure that no metal-to-metal contact occurs.

True rotation of flywheel 36 about quill 42 is achieved through the combination of hydrostatic bearing 70 and hydrostatic bearings 72, 74. Together, hydrostatic bearings 70, 72, 74 ensure flywheel 36 will rotate about quill 42 without axial movement along quill 42. Hydrostatic bearings 72, 74 exert axial force inward toward thrust plates 60, 62, respectively, thereby damping oscillations or jolts to flywheel 36 during its rotation. In addition, the hydrostatic bearings 70, 72, 74 ensure that flywheel 36 does not lean, tip, or become unbalanced along quill 42 as flywheel 36 rotates. As a result, true rotation of flywheel 36 is more closely achieved.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A press comprising:

a frame structure with a crown and a bed;

a slide for reciprocating movement in opposed relation to said bed;

a drive mechanism attached to said frame structure;

a flywheel having two axial faces, said flywheel rotatably driven by said drive mechanism, said flywheel mounted to said frame structure; and a flywheel bearing comprising:
        at least one thrust plate, said thrust plate secured to said flywheel on one of said two axial faces; and
        at least one hydrostatic bearing pad, said hydrostatic bearing pad disposed adjacent a respective thrust plate such that axial movement of the flywheel is limited.

2. A press according to claim 1 wherein said thrust plate is secured to a hub of said flywheel.

3. A press according to claim 1, wherein said at least one thrust plate further comprising:

two thrust plates each secured to a respective axial face of said flywheel.

4. A press according to claim 1 wherein said at least one thrust plate is bronze.

5. The press according to claim 1 wherein said at least one hydrostatic bearing pad being mounted on said press frame.

6. A press comprising:

a frame structure with a crown and a bed;

a slide for reciprocating movement in opposed relation to said bed;

a drive mechanism attached to said frame structure;

a flywheel with a hub and having two axial faces, said flywheel rotatably driven by said drive mechanism, said flywheel mounted to said frame structure; and a flywheel bearing comprising:
        two thrust plates, each one of said two thrust plates secured to a respective axial face of said flywheel; and
        two hydrostatic bearing pads, each one of said two hydrostatic bearing pads disposed adjacent a respective thrust plate such that axial movement of the flywheel is limited.

7. The press according to claim 6 wherein said two hydrostatic bearing pads being mounted on said frame structure.

8. The press according to claim 6 wherein said two thrust plates being bronze.

9. A press comprising:

a frame structure with a crown and a bed;

a slide for reciprocating movement in opposed relation to said bed;

a drive mechanism attached to said frame structure;

a flywheel assembly having a hub and having two axial faces, said flywheel assembly rotatably driven by said drive mechanism, said flywheel assembly mounted to said frame structure;

a flywheel bearing supporting said flywheel assembly, said bearing comprising:
        a quill assembly having a quill non-rotationally connected to said frame structure;

a bearing bushing connected to said flywheel assembly and having an internal bore which forms a bearing surface disposed about said quill with a clearance, said quill includes a plurality of hydrostatic bearing pads that open toward said bearing surface, said bearing bushing having relative rotation with respect to said quill during operation;

two thrust plates, each one of said two thrust plates secured to a respective axial face of said flywheel assembly; and two hydrostatic bearing pads connected to the press, each one of said two hydrostatic bearing pads disposed adjacent a respective thrust plate such that axial movement of said flywheel assembly is limited.

10. The press according to claim 9 wherein said two hydrostatic bearing pads being mounted on said frame structure.

11. The press according to claim 9 wherein said two thrust plates being bronze.

* * * * *